Patented Feb. 12, 1929.                                                                 1,702,151

UNITED STATES PATENT OFFICE.

ROBERT CALVERT, OF WILMETTE, ILLINOIS, ASSIGNOR TO VAN SCHAAK BROS. CHEMICAL WORKS, INC., OF CHICAGO, ILLINOIS, A CORPORATION OF ILLINOIS.

PYROXYLIN COMPOSITION.

No Drawing.        Application filed January 26, 1928.   Serial No. 249,761.

My invention relates to a composition of matter comprising pyroxylin and a solvent of such properties as to distinguish the composition from any previously used or described.

As the pyroxylin lacquer industry has expanded from sales at the rate of a million gallons yearly to nearly thirty times that amount, there has been an attendant expansion in the variety of solvents required. Brushing lacquer, for example, has come into wide use. Yet brushing lacquer does not approach paint or varnish in volume of sales, and some consider that brushing lacquer will not become as much used as paint or varnish unless there is provision of a composition of properties not heretofore known.

It is true that various solvents have been proposed to improve upon particular weaknesses in brushing lacquer. The substitution of the ethyl ether of ethylene glycol for butyl acetate, for example, eliminates the so-called "choking odor" of the latter, but introduces difficulties due to the precipitation of resins in certain lacquer films. It is important to have a solvent which, when made into a composition with pyroxylin, gives not only a satisfactory odor, but is also compatible with ester, damar, and shellac resins under all usual conditions of use, has such a slow rate of evaporation as to make possible the clearing of brush marks in a brushed lacquer film before the lacquer dries or sets, and has such low solvent power for pyroxylin that it does not soften excessively a lacquer undercoat over which it is brushed, even though the solvent evaporates so slowly as to remain long in contact with the undercoat.

A combination of desirable properties, I have discovered, is possessed by compositions comprising pyroxylin and the acetate of 4-methyl-2-pentanol, of the composition and structure represented by the formula $$CH_3.COO.CH(CH_3).CH_2.CH(CH_3)_2.$$

The compound may be called the acetate of methyl-isobutyl carbinol and by this name, as used by me, I means the acetate of 4-methyl-2-pentanol, of the formula given above.

The acetate of methyl-isobutyl carbinol may be made in any suitable manner, for example, by a process which comprises the interaction of 2-chlor-4-methyl pentane with sodium acetate, under suitable conditions. In the laboratory it is more convenient, however, to prepare first the alcohol, methyl-isobutyl carbinol, esterify, as with an excess of acetic anhydride, neutralize with an aqueous solution of sodium carbonate, wash, dry and distil the acetate of methyl-isobutyl carbinol.

The acetate of methyl-isobutyl carbinol boils at approximately 146° C. at a pressure equal to 748 mm. of mercury.

It evaporates from a shallow, open dish, at room temperatures, only 52% as fast as butyl acetate. It has an odor that is inoffensive and actually pleasing to many people. Finally, this ester has the desired compatibility with ester, damar, and shellac resins coupled with a relatively low solvent power for pyroxylin undercoats.

While reference has been made to brushing lacquer, I may use the acetate of methyl-isobutyl carbinol in lacquers for spraying also. Here the acetate is an effective anti-blush and possesses the advantages previously mentioned as to odor, compatibility with resins, and relatively lower solvent power for pyroxylin.

The acetate of methyl-isobutyl carbinol contains much hydrocarbon in proportion to the oxygen present and is such an excellent solvent for the most used resins, which also contain a very large proportion of hydrocarbon to oxygen, that this acetate may be used to overcome the resin precipitation or gum blush produced in lacquer films by certain other solvents.

This use is illustrated by the following lacquers containing each approximately 12 oz. of half-second pyroxylin and 16 oz. of ester gum per gallon of lacquer. The solvents and diluents here, as in all later formulas, are expressed as percentage by volume of the liquids added to the pyroxylin and resin.

| Lacquer No. | 1 | 2 | 3 | 4 |
|---|---|---|---|---|
| Acetate of methyl-isobutyl carbinol | 30% | 20% | 0% | 0% |
| Ethylene glycol mono-ethyl ether | 0 | 10 | 30 | 10 |
| Denatured alcohol (2B) | 5 | 5 | 5 | 10 |
| Ethyl acetate | 5 | 5 | 5 | 20 |
| Toluol | 60 | 60 | 60 | 60 |
| Resin present in lacquers #1–4 | 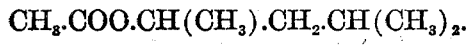 ester | | | |
| Resin present in lacquers #5–8 | | | | |
| Resin precipitated during drying of lacquer films? | no | no | yes | yes |

In making the tests, it is well to pour the lacquers onto pieces of polished brass, place the brass in an inclined position until the film is dry, apply second and third coats of lacquer in the same manner, and note the appearance of the dried, thick film.

From the table on the preceding page it is seen that the acetate of methyl-isobutyl carbinol may be used to overcome resin precipitation by the glycol ether. Similarly, the acetate may be used to prevent precipitation by ethyl lactate, as in a lacquer containing pyroxylin and ester gum and 10 parts of the acetate to 1 part of ethyl lactate.

There follow other illustrative compositions containing the acetate of methyl-isobutyl carbinol and, in each case, ½—second, alcohol—wet pyroxylin in amount equivalent to 16 oz., dry weight, of pyroxylin to a gallon of lacquer.

| Lacquer No. | 5 | 6 | 7 | 8 | 9 |
|---|---|---|---|---|---|
| Acetate of methyl-isobutyl carbinol | 25% | 10% | 10% | 10% | 25% |
| Butyl acetate | | 20 | 20 | 20 | 15 |
| Dibutyl phthalate | | | | 3 | 3 |
| Butyl alcohol | | | | 5 | 7 |
| Denatured alcohol | 5 | 5 | 5 | | |
| Ethyl acetate | 5 | 5 | 5 | 5 | |
| Xylol | | | | | 20 |
| Toluol | 45 | 60 | 50 | 57 | 30 |
| Benzol | 20 | | | | |
| 58° naphtha | | | 10 | | |

Other formulas that are adapted especially for brushing are given below. These lacquers contain each 12 oz. of ½ second pyroxylin, 15 oz. of ester gum (Paramet brand,) and 6 oz. of dibutyl phthalate per gallon of the finished lacquer, the volatile material in which has the percentage composition shown.

| Lacquer No. | 10 | 11 |
|---|---|---|
| Acetate of methyl-isobutyl carbinol | 45% | 55% |
| Xylol | 55 | 25 |
| Petroleum fraction boiling at 140–150° C. | | 20 |

If pyroxylin that has been dehydrated with xylene is used in making formulas 10 and 11, there will be present in the composition no appreciable amount of liquid boiling below 130° C. This gives to the lacquer an unusually long brushing time. The odor is quite satisfactory and because of the relatively slow solvent action of the acetate of methyl-isobutyl carbinol, there is not undue softening of a pyroxylin undercoat over which the lacquer is brushed.

The acetate of methyl-isobutyl carbinol used in the formulas contained 100% of actual ester.

It should be understood that the specific formulas are given by way of illustration only, and that many variations may be made without departing from the spirit of my invention, so long as the composition includes pyroxylin and the acetate of methyl-isobutyl carbinol. Thus, in lacquers 1 to 11 inclusive, amyl acetate and amyl alcohol may be substituted for butyl acetate and butyl alcohol respectively in the above formulas.

Also, ester gum, dewaxed damar, or shellac may be added to any or all of the formulas, as, for example, in the proportion of one-fourth to 1 part of the resin for each 1 part of pyroxylin.

Other plasticizers may be used, as, for example, tricresyl phosphate or di-normal-amyl phthalate. The plasticizer may be added to any or all of the formulas.

Pigments also may be added, as for example, zinc oxide or chrome yellow.

Stabilizers may be added as, for example, urea or dicyandiamid.

Oils may be included, as, for example, castor oil, soya bean, or linseed.

I claim:

1. A composition of matter comprising pyroxylin and the acetate of methyl-isobutyl carbinol.

2. A composition of matter comprising pyroxylin, the acetate of methyl-isobutyl carbinol, and a pyroxylin solvent that contains an hydroxyl group.

3. A composition of matter comprising pyroxylin, the acetate of methyl-isobutyl carbinol, and the monoethyl ether of ethylene glycol.

4. A composition of matter comprising pyroxylin, the acetate of methyl-isobutyl carbinol, and the monoethyl ether of ethylene glycol, the proportion of the latter being less than that of the acetate.

5. A composition of matter comprising pyroxylin, dibutyl phthalate, and the acetate of methyl-isobutyl carbinol.

ROBERT CALVERT.